Lewis & Miller,
Machine Gearing,
No. 63,266. Patented Mar. 26, 1867.

Witnesses,

Inventors,

United States Patent Office.

MOSES LEWIS AND SAMUEL MILLER, OF GREENVILLE, CONNECTICUT.

Letters Patent No. 63,266, dated March 26, 1867.

---

IMPROVEMENT IN PULLEYS FOR BELTING.

---

The Schedule referred to in these Letters Patent and making part of the same.

---

TO ALL WHOM IT MAY CONCERN:

Be it known that we, MOSES LEWIS and SAMUEL MILLER, of Greenville, in the county of New London, and State of Connecticut, have invented new and improved Belting Pulley; and we do hereby declare that the following is a full, clear, and exact description thereof, reference being had to the accompanying drawings, forming part of this specification.

The nature of our invention consists in constructing pulleys upon shafts running at right angles, in such a manner that the belt being at a half turn or twist, the strain is equal from one pulley to the other. Heretofore great difficulty has been encountered in running belts upon pulleys at right angles, for the reason that the strain all came upon one edge of the belt, and it was soon worn out and became worthless; beside, but a small per cent. of power is imparted from the belt when run upon the common pulleys at right angles. We obviate and overcome all the difficulties experienced in the use of the common pulleys running at right angles by increasing the edge of the pulley so as to take up the slack made in the belt by the twist, so that the belt has an equal bearing at both edges upon the face of the pulleys, which gives the whole surface of the belt an equal strain, and at the same time imparts its fullest capacity of power.

To enable others skilled in the art to make and use our invention, we will proceed to describe its construction and operation.

Figure 1:
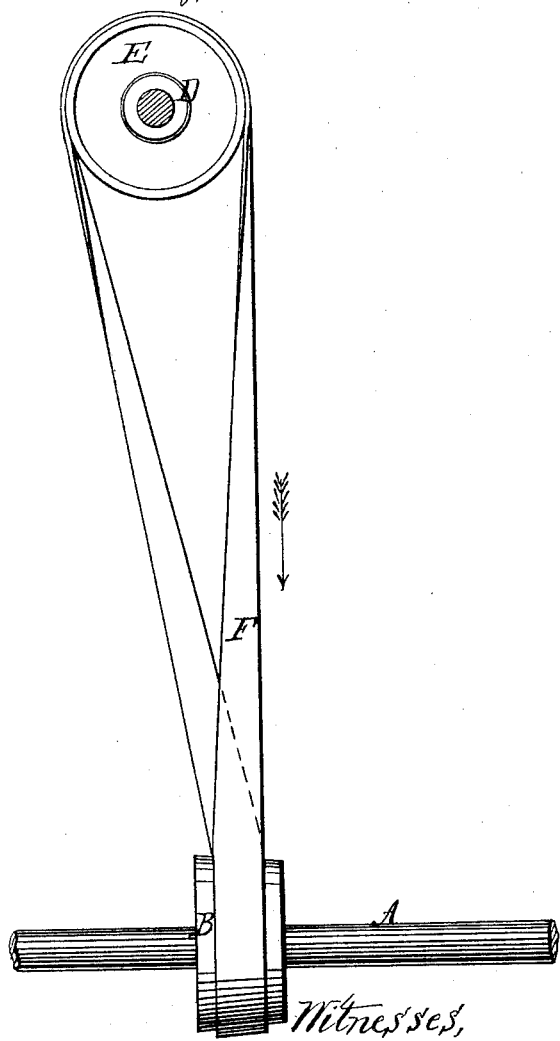
Figure 2:
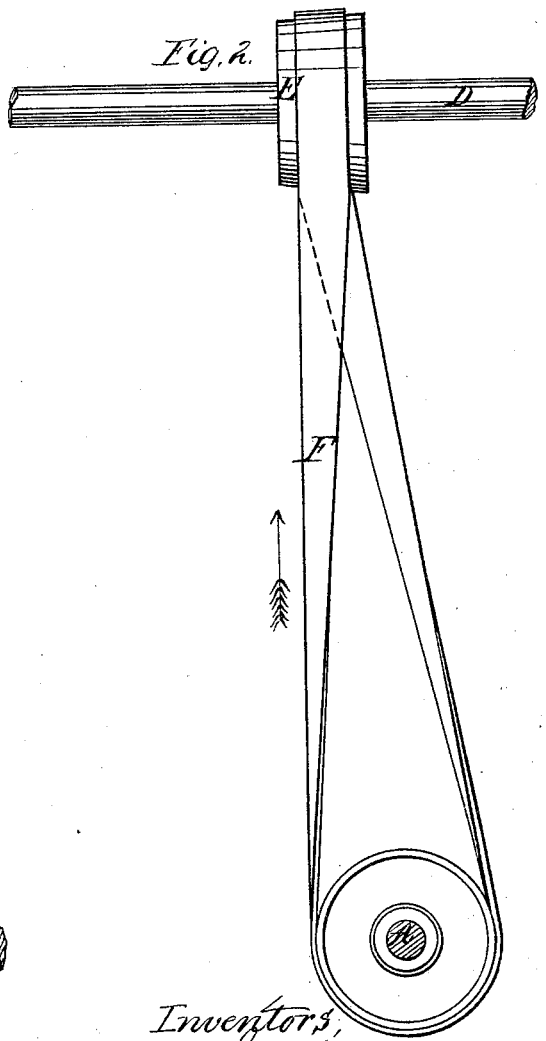

Figure 1 is a front elevation of our improved pulleys; and
Figure 2 is a side elevation of the same.
Letters of like name and kind refer to like parts in each of the figures.

In the figures, A represents a shaft of iron or wood, made in the common way, and upon which is secured a pulley, B, which is in the form of transverse sections of a cone. On the shaft D is also a pulley, E, of like form. Now it will be seen that the belt F is twisted one-half round, which takes up a portion of the belt on the side of the small end of the lower pulley B, fig. 1, and as the belt runs in the direction of the arrows the short side of the said belt ru s over the small end of the upper pulley E, so that the belt has an equal bearing upon the face of the pulleys, therefore is not subjected to unequal strain and wear, thus rendering it capable of doing much more service and imparting a greater amount of power.

Thus having described our invention, what we claim, and desire to secure by Letters Patent, is—

The tapering or conical pulleys B E, over which the twisted belt F circulates, arranged on shafts A D, at right angles to each other, for the purpose described, in the manner specified.

MOSES LEWIS,
SAMUEL MILLER.

Witnesses:
JAMES C. GILMOUR,
STERRY F. DAVIS.